(12) United States Patent
Leonardi et al.

(10) Patent No.: US 11,482,902 B2
(45) Date of Patent: Oct. 25, 2022

(54) EPOXY-IRON MIX STATOR LINER SYSTEM

(71) Applicant: Ford Global Technologies, LLC, Dearborn, MI (US)

(72) Inventors: Franco Leonardi, Dearborn Heights, MI (US); Leyi Zhu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 17/150,078

(22) Filed: Jan. 15, 2021

(65) Prior Publication Data

US 2022/0231560 A1 Jul. 21, 2022

(51) Int. Cl.
| | |
|---|---|
| *H02K 3/34* | (2006.01) |
| *H02K 3/487* | (2006.01) |
| *H02K 3/30* | (2006.01) |
| *B60K 1/00* | (2006.01) |

(52) U.S. Cl.
CPC ............. *H02K 3/345* (2013.01); *H02K 3/30* (2013.01); *H02K 3/487* (2013.01); *B60K 1/00* (2013.01)

(58) Field of Classification Search
CPC ... B60K 1/00; H02K 3/30; H02K 3/34; H02K 3/345; H02K 3/487; H02K 3/50; H02K 2203/12
USPC .................. 310/214, 215, 216.105, 216.115
See application file for complete search history.

(56) References Cited

U.S. PATENT DOCUMENTS

| | | | |
|---|---|---|---|
| 3,255,512 A | 6/1966 | Lochner et al. | |
| 4,429,240 A | 1/1984 | Kishi | |
| 2002/0074892 A1* | 6/2002 | Lindbery | H02K 1/165 310/216.004 |
| 2004/0207284 A1* | 10/2004 | Neet | H02K 3/48 310/215 |
| 2014/0191629 A1* | 7/2014 | Takahashi | H02K 11/25 310/68 C |
| 2016/0248308 A1* | 8/2016 | Ogawa | H02K 15/022 |
| 2018/0138760 A1 | 5/2018 | Kim | |
| 2019/0027989 A1* | 1/2019 | Ishigami | H02K 3/345 |
| 2020/0052542 A1* | 2/2020 | Gentz | H02K 3/522 |
| 2020/0156296 A1* | 5/2020 | E Silva | H02K 3/28 |
| 2020/0161916 A1* | 5/2020 | E Silva | H02K 3/345 |
| 2020/0161917 A1* | 5/2020 | E Silva | H02K 3/24 |
| 2020/0161918 A1* | 5/2020 | Almeida E Silva | H02K 3/12 |
| 2020/0161947 A1* | 5/2020 | Almeida E Silva | H02K 3/345 |
| 2020/0177057 A1* | 6/2020 | Uryu | H02K 3/30 |
| 2020/0366171 A1* | 11/2020 | Kimura | H02K 15/12 |
| 2021/0036568 A1* | 2/2021 | Schulz | H02K 3/12 |
| 2021/0135528 A1* | 5/2021 | Senoo | H02K 3/12 |
| 2021/0249926 A1* | 8/2021 | Enomoto | H02K 3/12 |
| 2021/0320538 A1* | 10/2021 | Lin | H02K 3/493 |
| 2021/0384779 A1* | 12/2021 | Takahashi | B60L 50/51 |
| 2022/0006344 A1* | 1/2022 | Sumitomo | H02K 3/14 |
| 2022/0021259 A1* | 1/2022 | Almeida E Silva | H02K 3/345 |

\* cited by examiner

*Primary Examiner* — Rashad H Johnson
(74) *Attorney, Agent, or Firm* — David Kelley; Brooks Kushman, P.C.

(57) ABSTRACT

A stator includes a core and an over-molded midsection arranged to define a plurality of slots, and a plurality of conductors wound within the slots. Portions of the midsection immediately adjacent to the slots have iron particles embedded therein such the portions have magnetic permeability greater than other portions of the midsection lacking the iron particles.

20 Claims, 5 Drawing Sheets

EPOXY-IRON MIX STATOR LINER SYSTEM

TECHNICAL FIELD

The present disclosure relates to controlling magnetic permeability between a stator and a stator coil via use of a transfer molded mid-section.

BACKGROUND

Extended drive range technology for electric vehicles, such as battery electric vehicles and plug in hybrid vehicles, continually increases demand on electric machines used for vehicle propulsion. Achieving increased driving ranges may require traction batteries and electric machines to have higher power outputs. One way to achieve a higher power output is to increase the flux carrying capabilities of a stator, a component of the electric machine, thereby increasing its torque producing capabilities.

SUMMARY

An electric machine includes a stator having a core and an over-molded midsection arranged to define a plurality of slots, and a plurality of conductors wound within the slots. Portions of the midsection immediately adjacent to the slots have iron particles embedded therein such the portions have magnetic permeability greater than other portions of the midsection lacking the iron particles.

A stator includes a core and an over-molded midsection. The core and the over-molded midsection are arranged to define a plurality of slots. The stator also includes a plurality of conductors wound within the slots. Portions of the midsection immediately adjacent to the slots include ferromagnetic particles embedded therein. The stator further includes a plurality of non-magnetic wedges disposed between the conductors and an inner diameter surface of the stator.

A stator includes a core and an over-molded midsection. The core and the over-molded midsection are arranged to define a plurality of slots. The stator also includes a plurality of conductors wound within the slots. Portions of the midsection immediately adjacent to the slots include ferromagnetic particles embedded therein.

DETAILED DESCRIPTION

Figure 1:
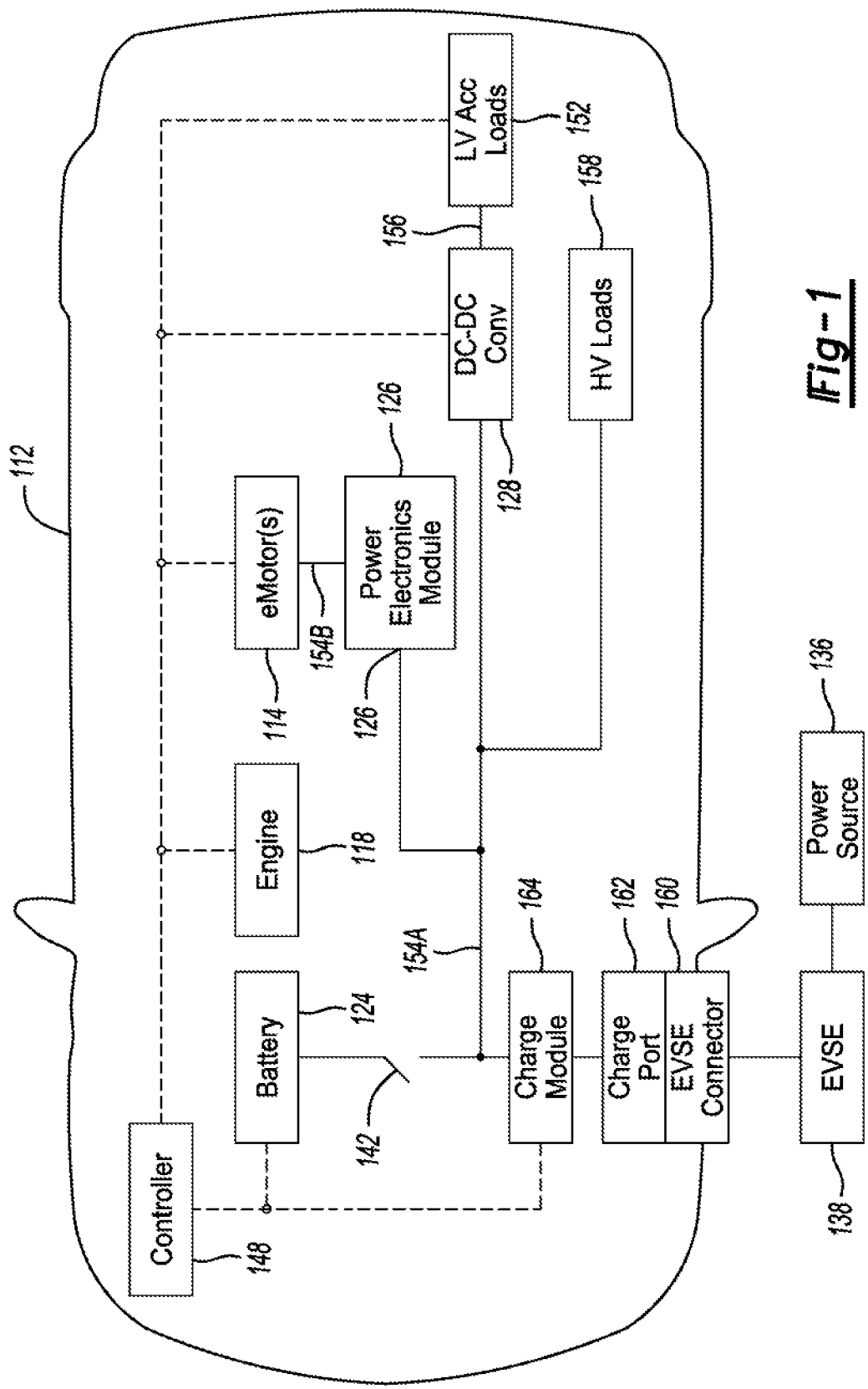
FIG. 1 is a schematic diagram of an example electric vehicle.

The disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Vehicles that use a traction motor drive for propulsion are referred to as electric vehicles (EVs). There are three main classes of electric vehicles. These three classes, which are defined by the extent of their electricity consumption, are namely: Battery Electric Vehicles (BEV), Hybrid Electric Vehicles (HEV), and Plug-In Hybrid Electric Vehicles (PHEV). Battery electric vehicles generally use an external electrical grid to recharge their internal battery and power their electric motors. Hybrid electric vehicles use a main internal combustion engine and a secondary supplemental battery to power their motors. Plug-in hybrid electric vehicles, in contrast to the hybrid electric vehicles, use a main large capacity battery and a secondary internal combustion engine to power their motors. Some plug-in hybrid electric vehicles can also run solely on their internal combustion engine without engaging the motors.

Electric vehicles typically include one or more electric machines. The electric machine may be referred to as an electric motor, a traction motor, or a generator. The electric machine may be a permanent magnet machine or an induction machine. Depending on the operating conditions, the electric machine may be capable of working as a motor or a generator. For example, the electric machine may provide torque for vehicle propulsion or act as a generator for converting mechanical power into electrical power using regenerative breaking technology. The electric machine may also provide reduced pollutant emissions since electric vehicles may be operated in either electric mode or hybrid mode to reduce vehicle fuel consumption. While the present disclosure is described in the context of an electric vehicle, it is to be understood that it may be used in connection with nonautomotive applications. For example, the disclosed electric machine may be used in manufacturing equipment or power-generation machines.

FIG. 1 depicts a Hybrid Electric Vehicle ("HEV") 112. The HEV 112 includes an electrified propulsion system having one or more electric machines 114 mechanically coupled to a hybrid transmission (not shown). In addition, the hybrid transmission is mechanically coupled to an internal combustion engine 118 (i.e., ICE). The electric machines 114 are arranged to provide propulsion torque as well as slowing torque capability either while the engine 118 is operated or turned off. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 stores energy that can be used to power the electric machines 114. The battery pack 124 provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high voltage bus 154B and the electric machines 114. According to some examples, the traction battery 124 may provide a DC current while the electric machines 114 operate using a three-phase alternating current (AC). The power electronics module 126 may convert the DC current to a three phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery (e.g., 12V battery). The low-voltage loads 152 may be electrically coupled to the low-voltage bus 156. The low-voltage loads 152 may include various controllers within the vehicle 112. One or more high-voltage electrical loads 158 may be coupled to the high-voltage bus 154. The high-voltage electrical loads 158 may further include compressor and electric heaters.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 may have a charge connector 160 for plugging into a charge port 162 of the vehicle 112. The charge port 162 may be electrically coupled to an on-board power conversion module or a charge module 164. The charge module 164 may condition the power supplied from the EVSE 138 to provide proper voltage and current levels to the traction battery 124.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components such as governing electrical flow to and from the one or more electric machines.

Figure 2:
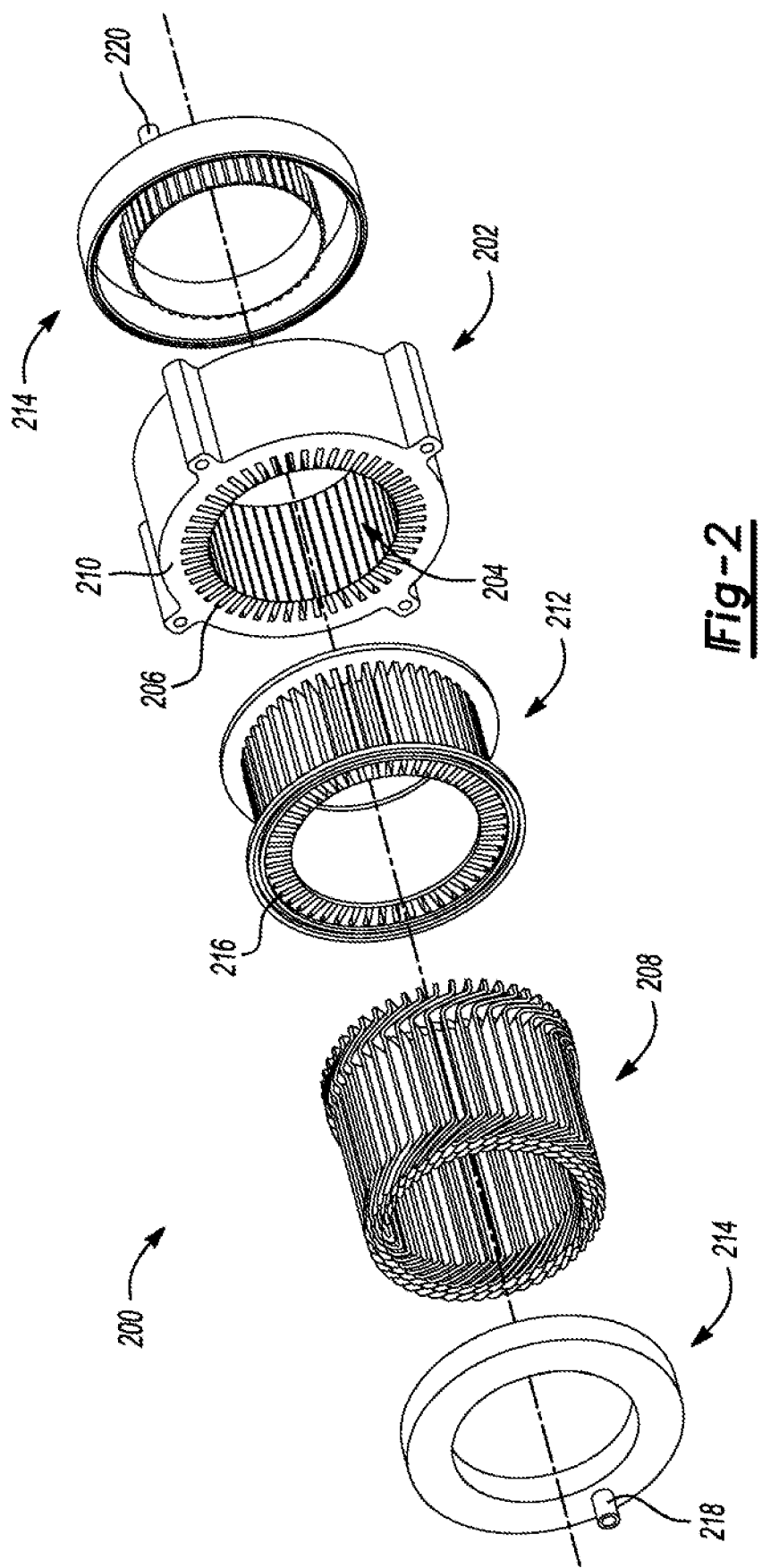
FIG. 2 is an exploded assembly view of a disassembled stator.

An electric machine may comprise a stator and a rotor, for example, for propulsion of an electric vehicle. FIG. 2 depicts an exploded view of a disassembled stator 200. The stator 200 may comprise a plurality of laminations (not shown) having a front side and a back side. When stacked, the front and back sides are disposed against adjacent front and back sides to form a stator core 202. Each lamination also includes an outer diameter (or outer wall) and an inner diameter (or inner wall). The outer diameters cooperate to define an outer surface of the stator 200, and the inner diameters cooperate to define a cavity 204.

The stator core 202 may include a number of slots 206 spaced about a circumference of the stator core 202. A plurality of windings (also known as coils, wires, or conductors) 208 may be wrapped around the stator 200 and are disposed within the stator slots 206. The windings 208 may be routed throughout the slots 206 in a serpentine fashion to create one or more winding paths to transmit current through the stator 200. Based on the arrangement of the windings 208, portions of the windings may protrude from an end face 210 of the stator core 202. In some specific examples, the windings 208 comprise copper hairpin windings that are routed throughout an iron alloy stator core. A plurality of individual hairpins may be inserted axially through slots 206 and have end portions that protrude beyond end face 210 to adjoin hairpins in adjacent slots.

The stator 200 may also include an over-molded midsection 212 formed about the stator core 202. The midsection 212 may be in-situ injection molded from a polymeric material in order to match the shape and features of the stator core 202. The midsection 212 may also include slots 216 arranged to correspond to slots 206 of the stator core 202 defining substantially rectangular slots to house the windings 208. In some embodiments, the polymeric material used may be epoxy.

While the electric machine operates as a motor, current supplied to the windings 208 generates an electromechanical field urging rotation of the rotor. While the electric machine operates as a generator, current is generated in the windings 208 from inertial rotation of the rotor, and energy may be stored in the battery and/or utilized to power other vehicle components. During operation of the electric machine both as a motor and as a generator, heat may be generated throughout the stator core 202 and windings 208. This heat may be removed from the electric machine using a cooling medium (e.g., by circulating transmission oil or other suitable cooling mediums). The cooling medium (or coolant) reduces the temperature of the windings 208 and the stator core 202 thereby allowing the stator to facilitate passage of higher electrical current load without causing an undesirable degree of heat generation.

A thermal management assembly may be used to facilitate the cooling medium. Accordingly, the electric machine may include a thermal management assembly that introduces an oil or other dielectric fluid to portions of the electric machine for cooling purposes. In some examples, the oil may be dripped or sprayed onto wires or windings of the electric machine. However, non-uniformity of coolant flow as applied to the windings may reduce cooling efficacy. An air-cooled thermal management assembly may alternatively be provided to assist in managing thermal conditions of the electric machine. Airflow cooling may require a fan or blower to be in fluid flow connection to the end windings to push air thereto for cooling purposes. Such a configuration may also require additional components such as ducting that consumes package space.

To address these drawbacks, a closed coolant channel assembly may be provided to assist in managing thermal conditions of the windings of the electric machine. In some specific examples, the closed coolant channel assembly may be formed from one or more injection molded polymeric components and mounted to the stator. In some embodiments, the closed coolant channel assembly is formed from an injection molded polymer. The closed coolant channel assembly may define an internal cavity arranged to direct coolant flow to be in thermal communication with windings the 208. In some embodiments, for example, a pair of end caps 214 may be provided near the end face 210 of the stator 200. The end caps 214 and the stator core 202 may be arranged with respect to one another to create a fluid seal therebetween and such that coolant routed through a channel is contained therein. In some embodiments, the end caps 214 may include one or more inlet ports 218 to receive a coolant flow from a reservoir or other source, and one or more outlet ports 220 to exhaust coolant from the electric machine thermal management system. Coolant flow into stator 200 allows heat removal from the end portions of the windings 208 that protrude beyond the end face 210 of the stator core 202.

Since these enhanced cooling capabilities may increase the heat removal efficiency, the stator may be able to accommodate additional electrical current loads without heat degradation concerns. For example, the stator teeth (i.e., portions of the core directly adjacent to stator slots) may be made larger to increase the flux carrying capabilities of the stator. Larger stator teeth, however, may shrink the slots and reduce the space available for conductors. Smaller space available for conductors may mean less material such as copper that contributes directly to torque production. Furthermore, slot liners, conventionally used to provide isolation between the conductors (such as copper) and the core (such as silicone steel core) may further reduce the space available in the slots.

Figure 3:
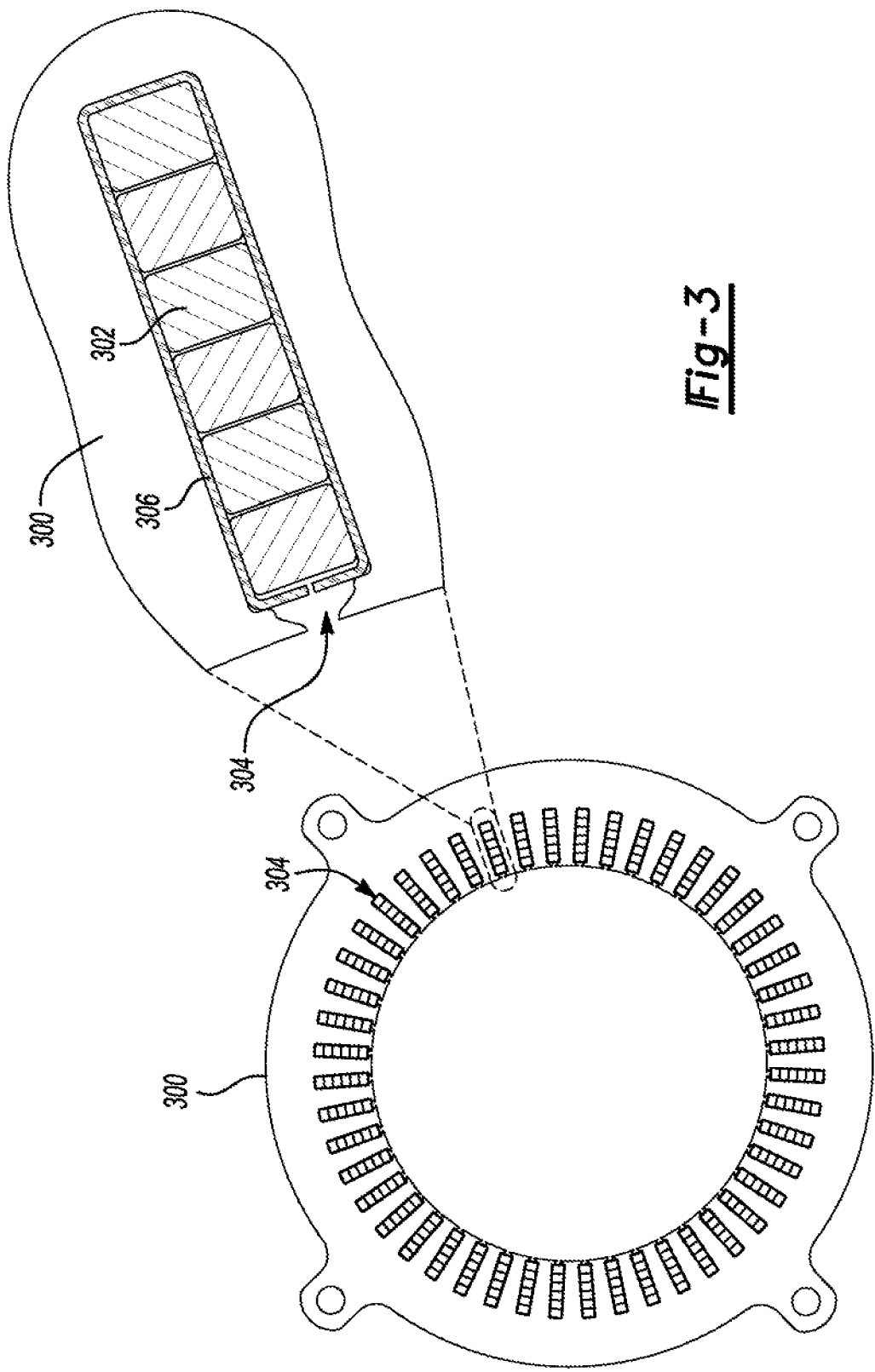
FIG. 3 is a plan view of a conventional stator slot.

FIG. 3, for example, shows a conventional stator 300 comprising at least one winding 302, at least one stator slot 304, and at least one slot liner 306 to provide insulation between the at least one winding 302 and the stator 300. The at least one slot liner 306 may be made of multiple layers of specialized paper, plastic, or the like for optimal dielectric and mechanical strength. To maximize efficiency, typically, only a minimum clearance necessary to insert the conductors 302 is left as free space.

To remedy one or more of the above-mentioned potential issues, a ferromagnetic material may be added to the transfer molded midsection (over-molded midsection) discussed above. In some embodiments, the ferromagnetic material may be iron or iron alloys. The transfer molded midsection may be formed from injection molded polymer. In some embodiments, the injection molded polymer may be epoxy. Accordingly, in some embodiments the transfer molded midsection may be made from an epoxy-iron mix. The high magnetic permeability of the epoxy-iron mix may increase the flux carrying capabilities of the stator and in turn increase the stator's torque producing capabilities. In some embodiments, the epoxy-iron midsection may replace the conventional slot liners. Accordingly, the space previously dedicated solely to slot liners for insulation between the conductors and the core may be replaced with an epoxy-iron mix transfer molded midsection which, unlike the previously used slot liners, may act as an active component of the magnetic circuit.

Figure 4:
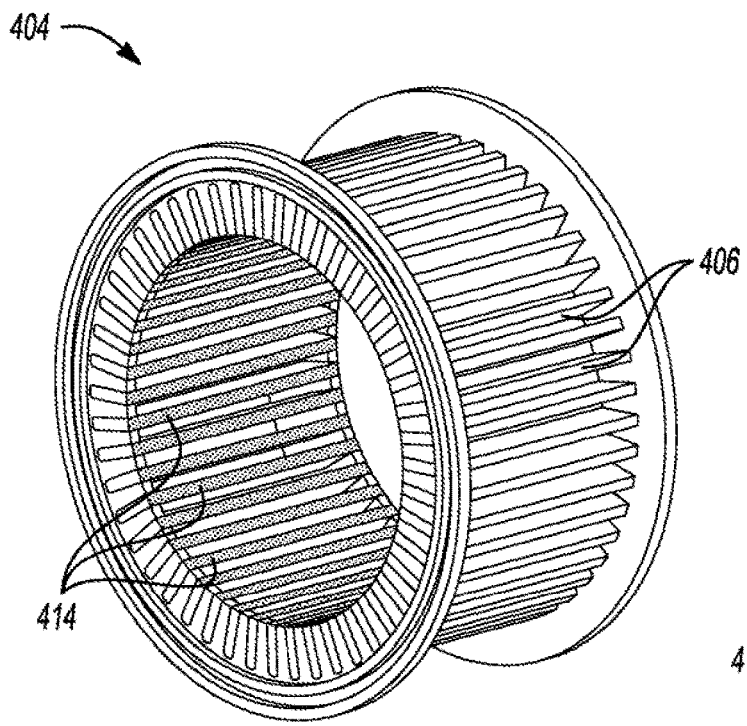
FIG. 4 is a perspective view of a transfer molded midsection.

FIG. 4 shows a perspective view of a transfer molded midsection 404 (otherwise referred to as over-molded midsection). The transfer molded midsection 404 may be formed from a pure polymer. In some embodiments, the transfer molded midsection 404 may be formed from a combination of a polymer (or a plurality of polymers) and a ferromagnetic material (or a plurality of ferromagnetic material). In one embodiment, the polymer used for forming the transfer molded midsection 404 may be epoxy. In one embodiment, the ferromagnetic material used to impregnate (dope) the polymeric component may be iron powder or iron alloy powder. While the present disclosure may refer to the transfer molded midsection as epoxy-iron formed, it is to be understood that this disclosure is not limited to this specific embodiment/material. Rather, the choice of polymer and ferromagnetic material, along with other components of the present disclosure, depends on the specific application and condition. For example, in some embodiments, the polymer impregnated with ferromagnetic material of the present disclosure may be silicone, polyurethane, phenolic, or any combination thereof. Similarly, in some embodiments of the present disclosure the ferromagnetic material used to impregnate the polymer may be an iron silicon alloy, nickel, cobalt, or any combination thereof.

The transfer molded midsection 404 of FIG. 4 may comprise a plurality of slots 406 arranged to correspond to slots of the stator core (not shown) to house windings (not shown). The transfer molded midsection 404 may further comprise a plurality of non-magnetic wedges 414 disposed at a short end of the slots 406 proximal to the center of the stator such that, once assembled, the non-magnetic wedges 414 may be disposed between the conductors and an inner diameter surface of the stator. Once assembled, the wedges 414 coupled to the transfer molded midsection 404 may entirely encase the windings. In some embodiments, the wedges 414 may be in direct contact with the conductors. The wedges 414 may be transfer molded to the midsection 404 in a two-step process or inserted prior to the transfer molding as a separated wedge. In some embodiments, the wedges 414 may be plastic. In some embodiments, a width of the non-magnetic wedges 414 immediately adjacent to the conductors is greater than a width of the non-magnetic wedges 414 adjacent to the inner diameter surface. In some embodiments, a material of the transfer molded midsection 404 may be different than a material of the non-magnetic wedges 414.

In some embodiments, the over-molded midsection 404 may be formed from an epoxy-iron mix. In some embodiments, some portions of the epoxy over-molded midsection may be free of iron particles to avoid increasing slot leakage inductance unnecessarily. In other words, the ferromagnetic impregnation of the polymeric over-mold may be uniform or nonuniform. In some embodiments, portions of the over-molded midsection 404 immediately adjacent to the slots 406 may have iron particles embedded therein such that these portions have a magnetic permeability greater than other portions of the over-molded midsection 404 which lack the iron particles.

Figure 5:
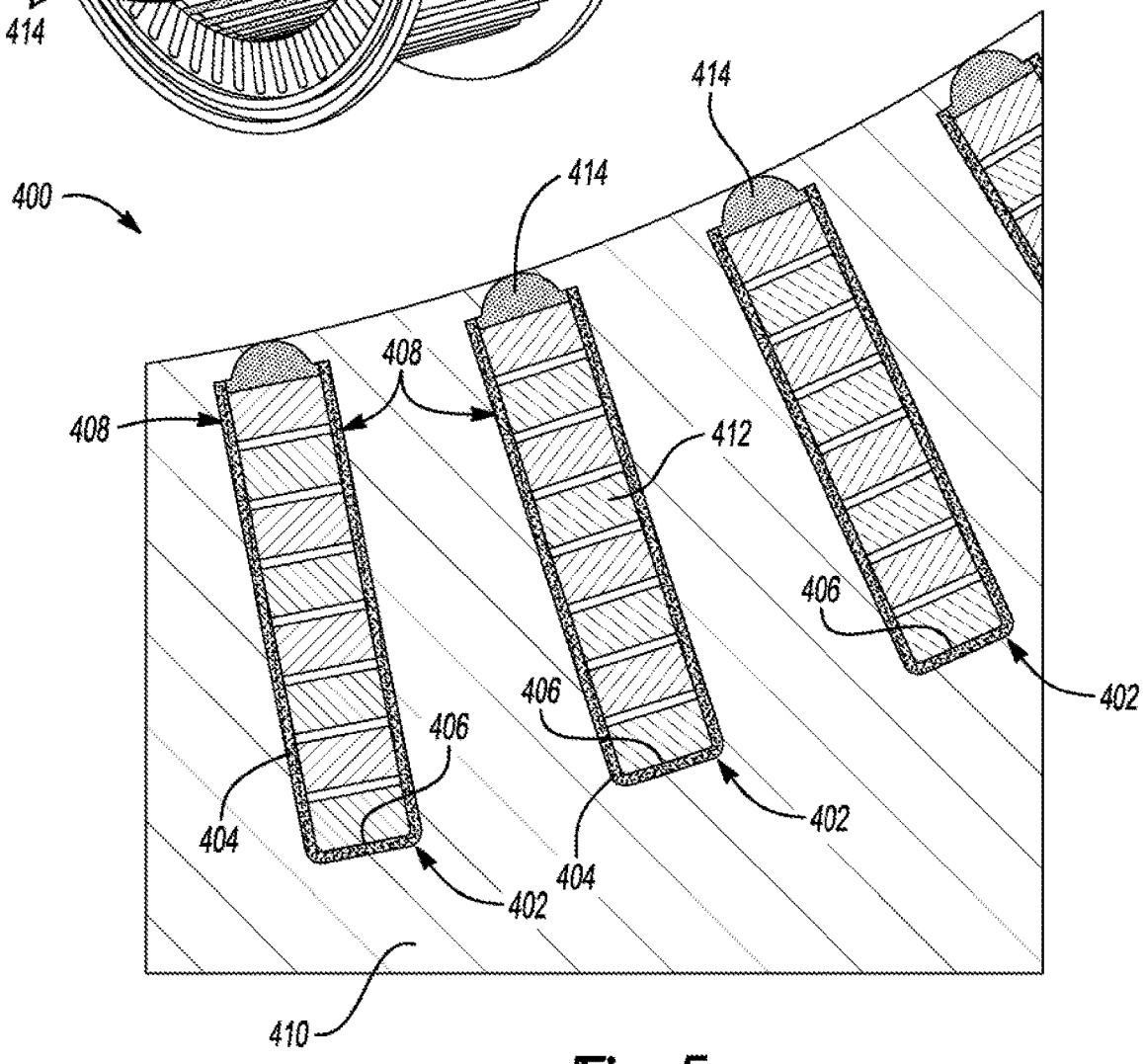
FIG. 5 is a cross sectional view of a portion of a stator.

FIG. 5 shows aa cross sectional view of a subsection of a stator 400 illustrating a detailed view of a plurality of stator slots 402. In some embodiments, an over-molded midsection 404 may comprise a plurality of over-molded midsection slots 406 corresponding to a plurality of stator core slots 408 collectively defining a plurality of stator slots 402. Accordingly, stator slots 402 may be defined from the coupling of the over-molded midsection 404 to a stator core 410. In some embodiments, such as that shown in FIG. 5, the over-molded midsection 404 may be formed from a ferromagnetically doped polymer. In some embodiments, the over-molded midsection 404 may be formed from an epoxy-iron mix. In some embodiment, the stator core 410 may completely surround the epoxy-iron over-molded midsection 404. Furthermore, in some embodiments, the epoxy-iron over-molded midsection 404 may completely surround at least one conductor (coil or winding) 412 such that the at least one conductor 412 is insulated from the stator core 410. In some embodiments, the over-molded midsection 404 may further comprise a plurality of non-magnetic wedges 414 disposed at a short end of the stator slots 402 proximal to the center of the stator 400. In other words, the plurality of non-magnetic wedges 414 may be disposed between the conductors 412 and an inner diameter surface of the stator 400.

In some embodiments such as that shown in FIG. 5, the over-molded midsection 404, which may be formed from an epoxy-iron mix, may replace a conventional slot liner commonly made from specialized paper. Accordingly, one advantage of the present disclosure may be that replacing the slot liners with the epoxy-iron over-molded midsection 404 may result in an improved thermal transfer between the conductors 412 and the stator core 410. This may be because thermal conductivity of the epoxy-iron mix is greater than conventional slot liners. Indeed, the thermal conductivity of the epoxy-iron mix may be greater than that of pure epoxy.

Figure 6:
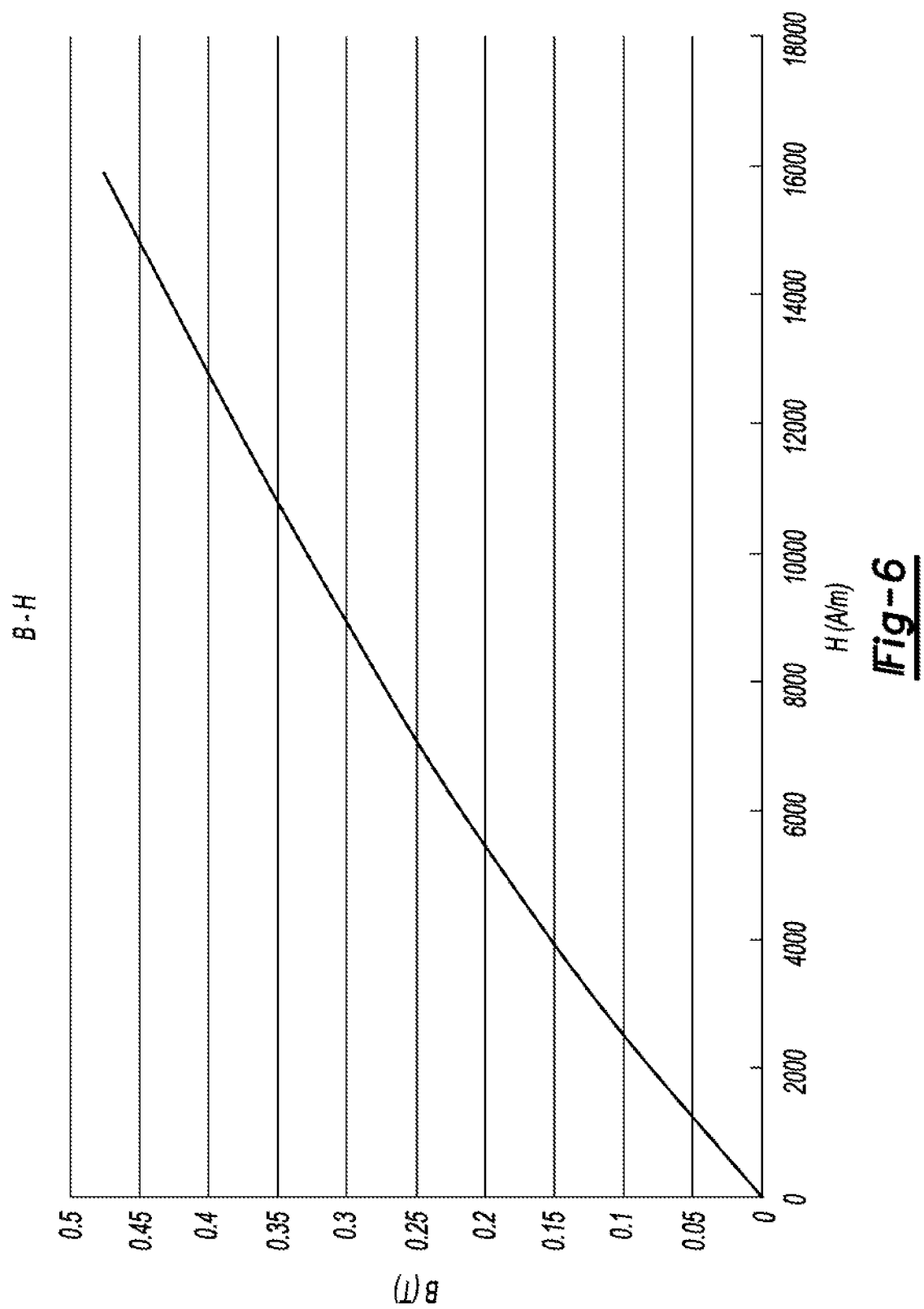
FIG. 6 is a plot of magnetic flux density versus magnetic field strength of the epoxy-iron mix.

FIG. 6 shows a graph of magnetic flux density versus magnetic field strength of the epoxy-iron mix. The ferromagnetic properties of the epoxy-iron mix with 94 weight percent (94 wt %) iron have been measured. Simply put, the magnetic flux density is the amount of magnetic induction due to applied magnetic field strength. Magnetic field strength is the amount of magnetizing force. Saturation refers to a state when an increase in external magnetic field no longer increases the magnetization of the material. The epoxy-iron mixture is expected to saturate at 1.36 Teslas. The iron loading level in the epoxy-iron mix ensures the mix is electrically insulating.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator including a core and an over-molded midsection arranged to define a plurality of slots, and a plurality of conductors wound within the slots, wherein portions of the midsection immediately adjacent to the slots have iron particles embedded therein such the portions have magnetic permeability greater than other portions of the midsection lacking the iron particles.

2. The electric machine of claim 1, wherein a material of the over-molded midsection is epoxy.

3. The electric machine of claim 1, wherein the stator further includes a plurality of non-magnetic wedges disposed between the conductors and an inner diameter surface of the stator.

4. The electric machine of claim 3, wherein a material of the non-magnetic wedges is plastic.

5. The electric machine of claim 3, wherein a width of the non-magnetic wedges adjacent to the conductors is greater than a width of the non-magnetic wedges adjacent to the inner diameter surface.

6. The electric machine of claim 3, wherein a material of the over-molded midsection is different than a material of the non-magnetic wedges.

7. A stator comprising:
a core;
an over-molded midsection, wherein the core and the over-molded midsection are arranged to define a plurality of slots;
a plurality of conductors wound within the slots, wherein portions of the midsection immediately adjacent to the slots include ferromagnetic particles embedded therein; and
a plurality of non-magnetic wedges disposed between the conductors and an inner diameter surface of the stator.

8. The stator of claim 7, wherein the ferromagnetic particles are iron or iron alloys.

9. The stator of claim 7, wherein a material of the non-magnetic wedges is plastic.

10. The stator of claim 7, wherein a material of the over-molded midsection is epoxy.

11. The stator of claim 7, wherein a width of the non-magnetic wedges adjacent to the conductors is greater than a width of the non-magnetic wedges adjacent to the inner diameter surface.

12. The stator of claim 7, wherein a material of the over-molded midsection is different than a material of the non-magnetic wedges.

13. A stator comprising:
a core;
an over-molded midsection, wherein the core and the over-molded midsection are arranged to define a plurality of slots; and
a plurality of conductors wound within the slots, wherein portions of the midsection immediately adjacent to the slots include ferromagnetic particles embedded therein.

14. The stator of claim 13, wherein the ferromagnetic particles are distributed uniformly along the slots.

15. The stator of claim 13, wherein the ferromagnetic particles are iron powder or iron alloy powder.

16. The stator of claim 13, wherein the stator further includes a plurality of non-magnetic wedges disposed between the conductors and an inner diameter surface of the stator.

17. The stator of claim 16, wherein a material of the non-magnetic wedges is plastic.

18. The stator of claim 16, wherein the non-magnetic wedges are in direct contact with some of the conductors.

19. The stator of claim 16, wherein a width of the non-magnetic wedges adjacent to the conductors is greater than a width of the non-magnetic wedges adjacent to the inner diameter surface.

20. The stator of claim 16, wherein a material of the over-molded midsection is different than a material of the non-magnetic wedges.

\* \* \* \* \*